United States Patent [19]

Trimmer et al.

[11] 4,417,582

[45] Nov. 29, 1983

[54] RESOLUTION MEASURING DEVICE FOR ACOUSTICAL IMAGING SYSTEMS AND METHOD OF USE

[75] Inventors: William S. N. Trimmer, Belle Mead; David H. R. Vilkomerson, Princeton, both of N.J.

[73] Assignee: Technicare Corporation, Solon, Ohio

[21] Appl. No.: 290,266

[22] Filed: Aug. 5, 1981

[51] Int. Cl.³ .................................................. A61B 10/00
[52] U.S. Cl. 73/10 V X ................. 128/660; 128/661
[58] Field of Search ............... 73/10 V; 128/660, 661, 128/662, 663

[56] References Cited

U.S. PATENT DOCUMENTS

| | | | |
|---|---|---|---|
| 3,152,243 | 10/1964 | Andrews | 99/385 |
| 3,461,274 | 8/1969 | Williams | 99/385 |
| 4,327,738 | 5/1982 | Green et al. | 128/660 |

Primary Examiner—Richard J. Apley
Assistant Examiner—George Yanulis

[57] ABSTRACT

Ultrasound imaging systems such as those utilized in breast scanning and diagnosis require not only periodic maintenance but also evaluation of the resolution and depth of field capability so as to provide maximum information to the clinician utilizing the system. The resolution measuring device preferred incorporates helically contorted filaments physically arranged to intersect at a point thereby forming a known gradient of divergence. Measurement of the translational distance from the intersection point to the point of resolution of imaged lines will, with knowledge of the gradient, permit facile determination of the separation distance which corresponds to the resolution of the ultrasound imaging system.

8 Claims, 9 Drawing Figures

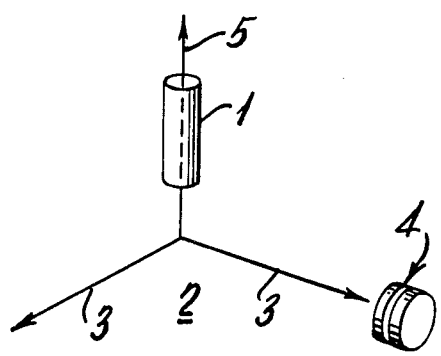
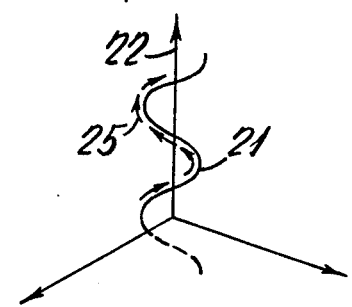
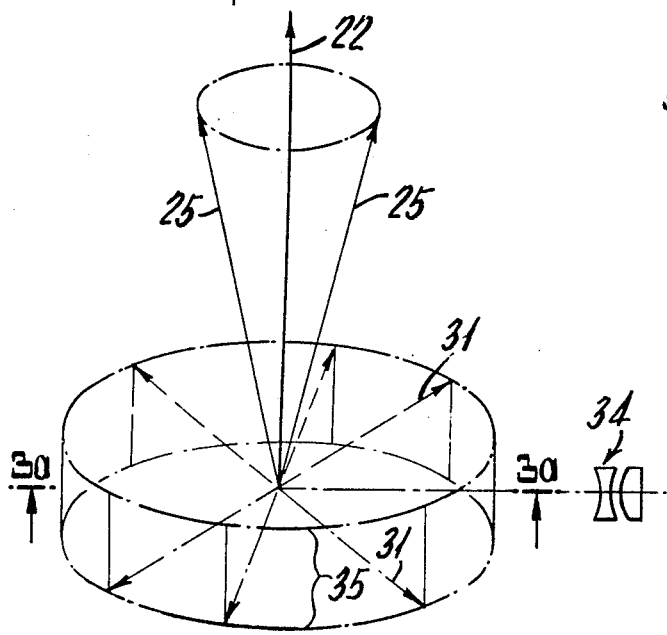
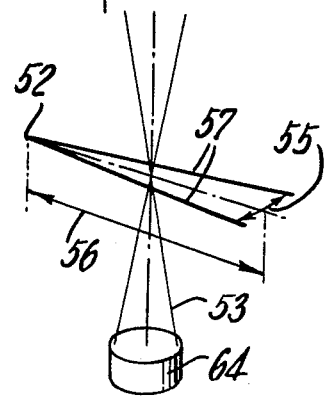
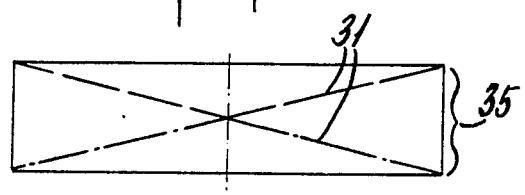

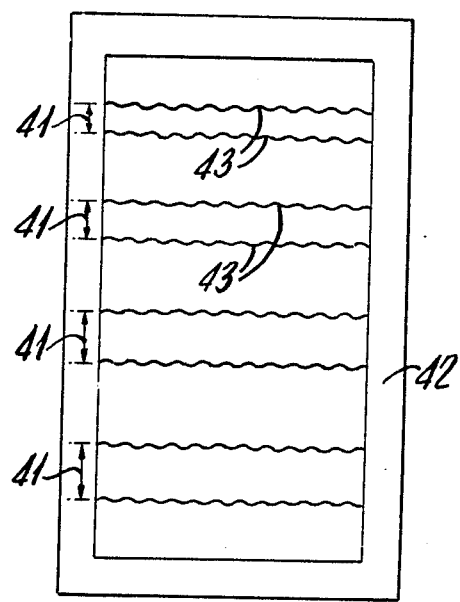
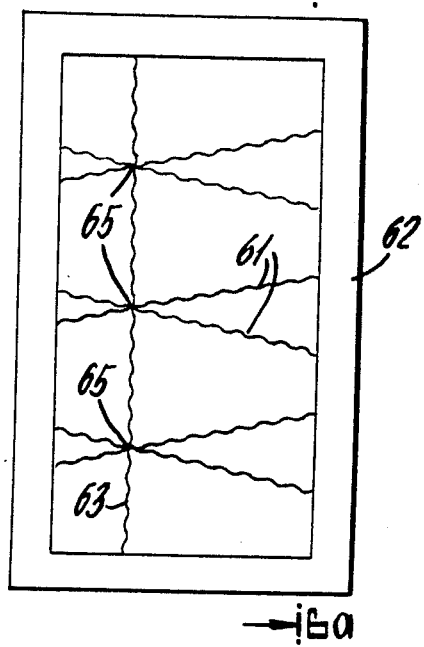
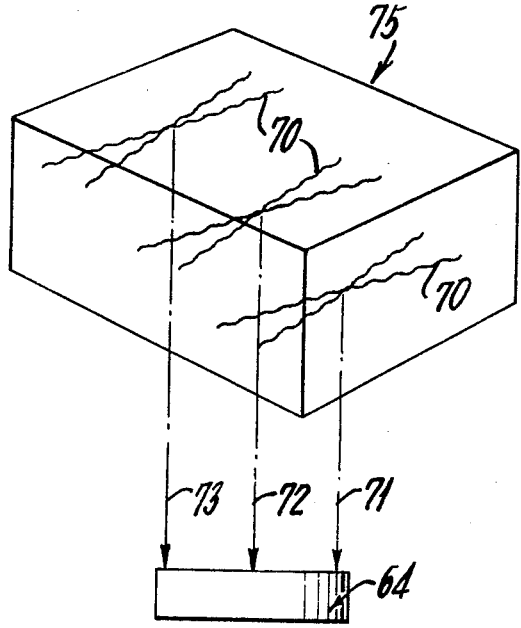
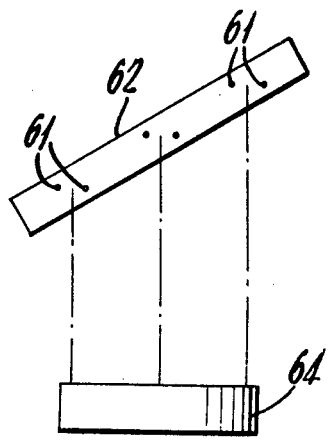

RESOLUTION MEASURING DEVICE FOR ACOUSTICAL IMAGING SYSTEMS AND METHOD OF USE

FIELD OF THE INVENTION

This invention relates to measuring devices for the determination of resolution, focal length and depth of field of acoustical imaging systems employed in ultrasound mammary scanning and more particularly those systems such as are described in commonly assigned Application Ser. No. 109,947.

BACKGROUND OF THE INVENTION

Ultrasound imaging systems have become a well accepted and important modality of diagnosis and guidance in many healthcare fields. For example, fetal monitoring, abdominal soft tissue study, and cardiac monitoring have all incorporated ultrasound systems as an essential aspect of effective diagnosis and treatment. Real time systems, where an organ or organism motion and development is observed as it occurs, has allowed practitioners to review many physiological conditions in vivo, in substitution for traumatic exploratory surgery or essential uncertainty as to the nature of the patient's condition.

In accordance with the knowledge of those of ordinary skill in the art, real time scanning systems work in a number of ways, including scanning an area of tissue by physical movement of an ultrasound transducer. In some systems, the transducer is coupled directly to the body of the patient, whereas in other systems the transducer is spatially separated from the body of a patient by a sonically conductive water path. In either case, as the transducer is "wobbled," typically by a stepping motor, the transducer is alternately conditioned to transmit a pulse of sonic energy into a tissue region, and then to receive echoes resulting from passage of the pulse through tissue interfaces. Electronic signal processing display apparatus assembles information resulting from the echoes, and based on the transducer position and local conditions, and upon the relative timing of the pulse transmission and echo receipts, a representation or image of the irradiated tissue is assembled.

The description of a preferred apparatus commonly used in ultrasound mammary scanning can be seen in co-pending Application No. 109,947 of Mezrich et al entitled Ultrasound Mammary Scanning Apparatus and filed Jan. 7, 1980. In accordance with the system described therein, the patient is conveniently positioned with the breast downwardly suspended in a tank of water, and from beneath, an ocillating or "nodding" transducer is scanned across the breast area, yielding a succession of spaced apart "B" scanned images. In the aggregate, these scans depict substantially all tissue within the breast, subject only to the limits of the resolution of the system with respect to each scan, and the spacing of the separate scans.

In order to accurately interpret the sonic image produced by such an apparatus, the diagnostician must be afforded information as to the size and accuracy of the informational bits composing the sonic image displayed. In short, he must be able to determine the resolution of the ultrasound transducer apparatus in order to accurately interpret the image produced. In addition, he must be able to test, on a convenient, systematic basis, the reliability and accuracy of the scanning apparatus.

The prior art solutions to these problems have heretofore involved the placement of straight wire phantoms within the acoustic energy field. Typically, these wires are held in some mounting device and arranged in pairs that are consecutively spaced apart with varying dimensions.

As the transducer head scans these consecutive pairs of wires, a transition point will be reached at which the transducer will first be capable of distinguishing or resolving the individual wires forming the pairs. The distance between the individual wires at the transition point is indicative of the resolution capability of the scanning apparatus.

This system of pairs of wires poses several problems to the technician attempting to utilize such a device to determine the accuracy and resolution of the scanning apparatus in question. Specifically, a wire presents a very small specular surface to the transducer beam and consequently, alignment of the wire becomes exceptionally critical in accordance with the well known laws of optics. Virtually only those acoustic waves impinging perpendicularly to the wire are reflected back to the transducer. All other impinging waves are reflected at varying angles and do not reach the transducer. Consequently, as the wire is tipped, great changes in image brightness result. Typically, however, as the image becomes brighter, it also becomes larger and therefore brightness must be continuously monitored in order to determine whether the increased size of the wire image is due to poor resolution or whether it is due to greater reflection of sound into the receiver. Further, such a system requires a great number of pairs of wires in order to afford the necessary range of spacings to adequately determine resolution.

It is an object of the present invention to reduce the number of wires required in order to effectively permit determination of resolution. It is a further objective that the critical degree of care required in the alignment of the straight wires with respect to the acoustical receiver be reduced so as to diminish the associated problems of dim, non-existent, or greatly changing images.

SUMMARY OF THE INVENTION

In accordance with the desired objectives, an apparatus is provided comprising a first contorted filament and means for supporting said first contorted filament. For purposes herein, contorted is defined as non-linearity occurring within a distance defined by one wavelength of the ultrasonic energy being used, which distance may be randomly chosen anywhere along the entire length of the filament exposed to the ultrasonic energy.

The contorted filament is preferably a helically twisted wire whose appearance may be likened to that of a strand within a twisted rope. In contrast to the previously used straight wire which reflected sound into a narrow range of angles, the helices reflect sound into a broad but well defined range of angles which are receivable by the sonic transducer. Consequently, for determination of image resolution, such a contorted filament target or phantom is easier to align because the image brightness and size produced by the scanning apparatus changes slowly with changes in filament orientation. The pitch of the helically twisted wire is at least equal to the wavelength of the acoustical energy.

In a preferred embodiment, resolution is measured by providing within the acoustical energy field, two contorted filaments joined at least at one point so as to form a v-shaped filament pair having a known gradient of divergence equal to the separation between the filaments per linear distance from the point of intersection. Typically, the gradient or amount of separation of the two contorted filaments per distance from the intersection point is known or determinable from physical measurements of the angle of intersection and/or actual physical dimensions. As the transducer assembly is scanned across the v-shape, an image will be produced permitting identification of the point where a minimally acceptable resolution of the two wires is reached. Knowing the gradient and the translation distance at which this point occurs from the intersection point will allow facile calculation of the separation distance between the filaments, which distance is representative of the resolution capabilities of the ultrasound scanning system. Ideally, if additional pairs of intersecting contorted filaments are disposed on said mounting means at various heights from the sonic transducer, then following a similar procedure, the depth of field as well as focal length of the ultrasound scanning apparatus can be determined.

Alternatively, a device is provided having a first contorted filament, means for supporting said first contorted filament, and a second contorted filament disposed on said support means substantially parallel to said first contorted filament and at a known distance from said first contorted filament.

Also provided is a method for measuring the acoustical resolution of a sonic transducer producing a sonic energy field comprising the steps of: placing within the sonic energy field a device comprising a first contorted filament, and a second contorted filament intersecting said first filament and forming a filament pair having a known gradient of divergence equal to the separation between the filaments per linear distance from the point of intersection, and means for supporting said first and second filaments; imaging the intersection point of the filaments for zeroing the ultrasound transducer; effecting a relative translation of the sonic energy field across the filament pair for determining a position at which the filaments are first resolved; and measuring the translation distance between the point of intersection and the position where the filaments are first resolved and calculating the product of said translation distance and said gradient.

An alternative method for measuring depth of field of a sonic transducer comprises the steps of placing within a sonic energy field produced by an ultrasound transducer a device comprising filaments pairs disposed on a mounting means at least at two different and known heights from said sonic transducer and wherein each of said filament pairs comprises a first contorted filament intersecting a second contorted filament so that a known gradient of divergence, equal to the separation between the filaments per linear distance from the point of intersection, is formed; imaging the plane of intersection points of the filaments for zeroing the ultrasound transducer; and imaging filament pairs at different distances from the transducer to determine the depth of field wherein filament pairs can be resolved.

Thus, the combination of the contorted filament shape as well as the composite shape of the filaments permits facile determination of resolution, focal length and depth of field while avoiding those problems previously associated with straight wire type phantoms.

BRIEF DESCRIPTION OF THE DRAWINGS

Other objects and advantages of the present invention will become apparent from the following specification and accompanying drawings wherein:

FIG. 1 geometrically indicates the plane containing perpendicular reflective phasors from a solid straight wire;

FIG. 2 diagramatically indicates the change in direction of surface tangents to a helically twisted filament;

FIG. 3 geometrically indicates the rotation of surface tangents about the axis of direction of a helically twisted filament and the resulting band of reflection phasors perpendicular to the tangents;

FIG. 3a is a cross-section of FIG. 3.

FIG. 4 shows one manner of employment of helically twisted filaments;

FIG. 5 shows a cross-sectional view of the placement of a pair of helically twisted filaments within an acoustic beam;

FIG. 6 is a top view of a preferred arrangement of helically twisted filament pairs;

FIG. 6a is a cross-section of the preferred arrangement of FIG. 6 in an ideal orientation with respect to the acoustic transducer;

FIG. 7 shows a cross-sectional view of yet another alternative arrangement of helically twisted filament pairs.

BEST MODE FOR CARRYING OUT THE INVENTION

The present invention is designed primarily for use in ultrasonic scanning apparatus such as the type depicted in co-pending Application Ser. No. 109,947 of Mezrich et al. To insure that such a device is operating properly and additionally, to provide the clinician with dimensional information concerning the ultrasonic images formed, resolution measurements must be performed.

With reference to FIG. 1, sonic energy from transducer 4 impinging upon a straight wire 1 aligned in a direction 5, is reflected along reflection phasors or perpendiculars 3 which form a two dimensional plane 2. Consequently, such a wire must be carefully positioned so that the transducer 4 is aligned with the plane 2 formed by the reflection phasors 3 perpendicular to the direction the wire 1 points. Only in this position will the transducer receive any of the reflected sonic energy transmitted along the reflection phasors. Any small misalignment of the wire will cause the sonic energy to be reflected in a plane which does not intersect the transducer. Consequently, no image will be formed.

FIGS. 2 and 3 indicate how a contorted filament of the present invention, ideally a helically formed filament, avoids these problems. FIG. 2 depicts a helically formed filament 21 having a central axis 22. Unlike the wire in FIG. 1 whose axis was co-incident with the direction of the wire, the filament in FIG. 2 forms a series of phasors 25 tangent to the curving filament. These tangent phasors, when depicted geometrically as in FIG. 3, are seen to rotate about axis 22. Since sonic energy is reflected perpendicularly to the tangent phasors 25, and since the tangent phasors 25 are constantly undergoing angular rotation, the sonic energy is reflected in a series of planes formed by the reflection phasors 31. The series of planes formed by the reflection phasors 31 effectively forms a band 35 of sonic energy. This band of energy is more visible to the ultrasonic receiver 34 than is the single plane 2 shown in FIG. 1.

As a result, the prior problems associated with the critical alignment of straight wires are eliminated. FIG. 3a is a cross-section showing the band 35 of sonic energy formed by reflection phasors 31.

Other forms of irregularly shaped or contorted filaments i.e., those which present a band of planes of reflected sonic energy, such as fine chains, a string of balls, among others, can be effectively employed in substitution for a helically twisted wire without departing from either the scope or the spirit of the invention.

FIG. 4 shows one possible arrangement of contorted filaments 43 held in a parallel configuration by frame 42. Preferably, separating distances 41 are varied so that each is different permitting a comparison of their images. For example, if one pair separated by a distance of two millimeters, is blurred but the next pair, separated by a distance of three millimeters, is clear then one can extrapolate the resolution as being between two and three millimeters. As may be appreciated, such an arrangement will require many pairs of wires if great accuracy is desired.

FIG. 5 shows a cross-sectional view of a preferred arrangement of helical filaments 57 intersecting at some point 52. Each filament pair is preferably contained within a plane located perpendicularly to the acoustic beam 53 produced by a typical acoustic scanning unit 64 well-known in the art. The filaments 57 forms a gradient which can be described as the ratio of linear distance 56 to separation distance 55 between the contorted filaments. For example, for each unit of linear distance traversed by the acoustical scanning unit, the separation may change 0.1 units.

In operation, the acoustical scanning unit will ideally be translated across the contorted filaments from meeting point 52 to open end 55 and back in consecutively narrower sweeps until the point at which the image lines resolve is determined. Measurement of the linear distance from point 52 to the point where the images resolve will, with the known gradient, permit a rapid and accurate determination of the separation distance between filaments 57 at that critical point representing the resolution capability of the acoustic scanning unit. If the unit has the capability of measuring its own translational distance (i.e., linear distance from point 52) then it typically will be "zeroed" at the intersection point 52 of the contorted filaments 57.

The arrangement of more than one pair of intersecting filaments is preferably such that all of the intersecting points of the contorted filament pairs 61, supported by mounting 62, lies within the same plane as shown in FIG. 6. In a preferred embodiment, the intersections were joined by a contorted filament 63 travelling transversely to the filament pairs in order to clearly mark the location of the intersection points 65 of the filament pairs 61 and help the ultrasound transducer 64 to image this location for zeroing.

FIG. 6a shows an ideal arrangement of the preferred embodiment of FIG. 6 with an acoustic transducer 64 so as to permit determination of resolution, focal length and depth of field without realignment of the phantom. The phantom may be advantageously held in this orientation by the use of velcro strips which permit rapid and easy deployment of the device.

The ideal location of the points of intersection within a single plane aids in the elimination of unneccessary confusion as to the linear distance for each pair of contorted filaments 70 when they are arranged at various distances 71, 72, and 73 from the acoustic transducer 64 as depicted by alternative cubic mounting 75 arrangement shown in FIG. 7. Such an alignment of intersection points and filament pairs is preferred because it simultaneously permits the facile determination of depth of field as well as resolution within the depth of field. Further, the invention permits the ready determination of the focal length of the transducer.

In a preferred embodiment of the resolution measuring device used to measure the resolution of a Technicare SMV120* breast scanner obtainable from Technicare Corporation, 29100 Aurora Road, Solon, Ohio 44139; a wire of twelve thousandths of an inch diameter was wound into a helix having an outside diameter of thirty thousandths of an inch and a pitch of sixty thousandths of an inch. Thus, the pitch of the helix was about equal to the size of the acoustic beam so that one loop of the helix was always within the acoustic beam. The pitch was chosen so as to be preferably larger than that of the wave length of the acoustical energy. Pitches smaller than the wave length of the acoustic energy are advantageously avoided since the smaller a helix is formed, the more the contorted filament will appear as a straight solid wire, thus assuming the problems such a wire entails. A second contorted filament e.g., helical wire in this case, similar to the first contorted filament was joined to the first contorted filament to form a v-shape filament pair having a 10 to 1 divergence gradient so that for each centimeter of linear translational distance, the filaments separated one millimeter.

*Trademark of Technicare Corporation

Ideally, the filaments within each pair are aligned so that the helices of each mutually conform in angular rotation, i.e., the filaments can be "nested". This synchronous alignment is preferred because variation of the distance between the filaments within individual loops is minimized.

The insertion of a straight wire within the helices of each filament may be advantageously employed to eliminate multiple reflections from the same loop encompassed within the scanning field. The multiple reflections can occur because within the wavelength of acoustic energy both the front external surface and the back internal surface of a loop are presented to the transducer. The inserted straight wire would eliminate the back surface reflection by blocking the incident acoustic energy. In substitution for a helically formed filament, a string of balls could advantageously be used since it would not present multiple reflections.

It will be apparent that the disclosure, as set forth, exhibits the preferred and illustrative embodiments of the principles of the present invention, but that numerous alternatives will occur to those of ordinary skill in the art without departure from the spirit or scope of the present invention.

We claim:

1. A sonically imaged device for the measurement of acoustical resolution of a sonic transducer which receives acoustical energy of a given wave length comprising:

a housing which contains the said sonic transducer, at least a first contorted filament which reflects acoustical energy of said given wave length; and
   means for supporting said first contorted filament.

2. The device as described in claim 1 which further comprises:

a second contorted filament intersecting the first contorted filament at a point to form a filament pair having a known gradient of divergence equal to the separation between the filaments per linear distance from the point of intersection.

3. The device as described in claim 2 which further comprises:

additional filament pairs disposed on said supporting means so that at least one of said additional filament pairs is at a different and known height from said sonic transducer relative to the height of said first-named filament pair for depth of field determination.

4. The device as described in claims 1 or 2 or 3 wherein the first contorted filament is a helically twisted wire.

5. The device as described in claim 4 wherein the pitch of the helically twisted wire is at least equal to the wave length of the acoustical energy reflected by said first contorted filament.

6. The device as described in claim 1 which further comprises a second contorted filament disposed on said supporting means substantially parallel to said first contorted filament and at a known distance from said first contorted filament.

7. A method for measuring the acoustical resolution of a sonic transducer producing a sonic energy field comprising the steps of:

placing within the sonic energy field a device comprising a first contorted filament, and a second contorted filament intersecting said first filament and forming a filament pair having a known gradient of divergence equal to the separation between the filaments per linear distance from the point of intersection, and means for supporting said first and second filaments;

imaging the intersection point of the filaments for zeroing the sonic transducer;

effecting a relative translation of the sonic energy field across the filament pair for determining a position at which the filaments are first resolved; and measuring the translation distance between the point of intersection and the position where the filaments are first resolved and calculating the product of said translation distance and said gradient.

8. A method for measuring depth of field of a sonic transducer comprising the steps of:

placing within a sonic energy field produced by a sonic transducer a device comprising filament pairs disposed on a mounting means at least at two different and known heights from said sonic transducer and wherein each of said filament pairs comprises a first contorted filament intersecting a second contorted filament so that a known gradient of divergence, equal to the separation between the filaments per linear distance from the point of intersection, is formed;

imaging the point of intersection of the filaments of one of said filament pairs for zeroing the sonic transducer; and imaging filament pairs at different distances from the transducer to determine the depth of field in which filament pairs can be resolved.

* * * * *